United States Patent [19]
Yamada et al.

[11] Patent Number: 5,879,417
[45] Date of Patent: Mar. 9, 1999

[54] PROCESS FOR PREPARING CARBON ELECTRODE FOR NONAQUEOUS SECONDARY BATTERY

[75] Inventors: Kazuo Yamada; Takehito Mitate; Naoto Nishimura; Yoshihiro Tsukuda, all of Nara; Tetsuya Yoneda, Mie, all of Japan

[73] Assignee: Sharp Kabushiki Kaisha, Osaka, Japan

[21] Appl. No.: 969,774

[22] Filed: Nov. 13, 1997

Related U.S. Application Data

[62] Division of Ser. No. 625,889, Apr. 1, 1996, Pat. No. 5,723,232.

[30] Foreign Application Priority Data

Apr. 24, 1995 [JP] Japan ..................... 7-098913
Mar. 1, 1996 [JP] Japan ..................... 8-044961

[51] Int. Cl.⁶ .......................... H01M 004/04
[52] U.S. Cl. .................. 29/623.5; 264/29.1; 264/105; 427/122
[58] Field of Search ............. 427/122; 29/623.5; 264/29.1, 105

[56] References Cited

U.S. PATENT DOCUMENTS 5,225,296 7/1993 Ohsawa et al. .
5,344,724 9/1994 Ozaki et al. .
5,344,726 9/1994 Tanaka et al. .
5,527,643 6/1996 Sonobe et al. ............... 264/105 X
5,589,299 12/1996 Yamada et al. ............... 427/122 X
5,601,950 2/1997 Yamahira et al. .

FOREIGN PATENT DOCUMENTS

0520667 A1 12/1992 European Pat. Off. .
0627777 A2 12/1994 European Pat. Off. .
4-92364 3/1992 Japan .
5-347155 12/1993 Japan .

OTHER PUBLICATIONS

Patent Abstracts of Japan, vol. 009, No. 160 (C–289), 4 Jul. 1985 & JP–A–60 036315 (Toray KK), 25 Feb. 1985.

Patent Abstracts of Japan, vol. 016, No. 318 (E–1232), 13 Jul. 1992 & JP–A–04 092364 (Sharp Corp.) 25 Mar. 1992.

*Primary Examiner*—John S. Maples
*Attorney, Agent, or Firm*—Nixon & Vanderhye P.C.

[57] ABSTRACT

A carbon electrode for a nonaqueous secondary battery is provided, which comprises a metal collector serving to catalyze carbon graphitization, graphite particles, and a carbon material having a lower crystallinity than the graphite particles, the graphite particles and the carbon material being sintered together on the metal collector or in the presence of the metal collector.

7 Claims, 5 Drawing Sheets

Fig.2A
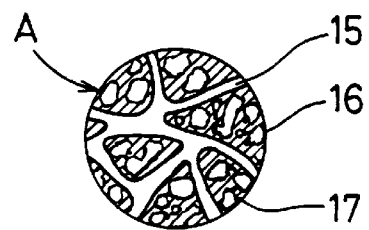
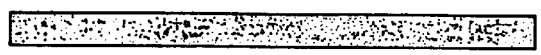
Fig.2B
Fig.3
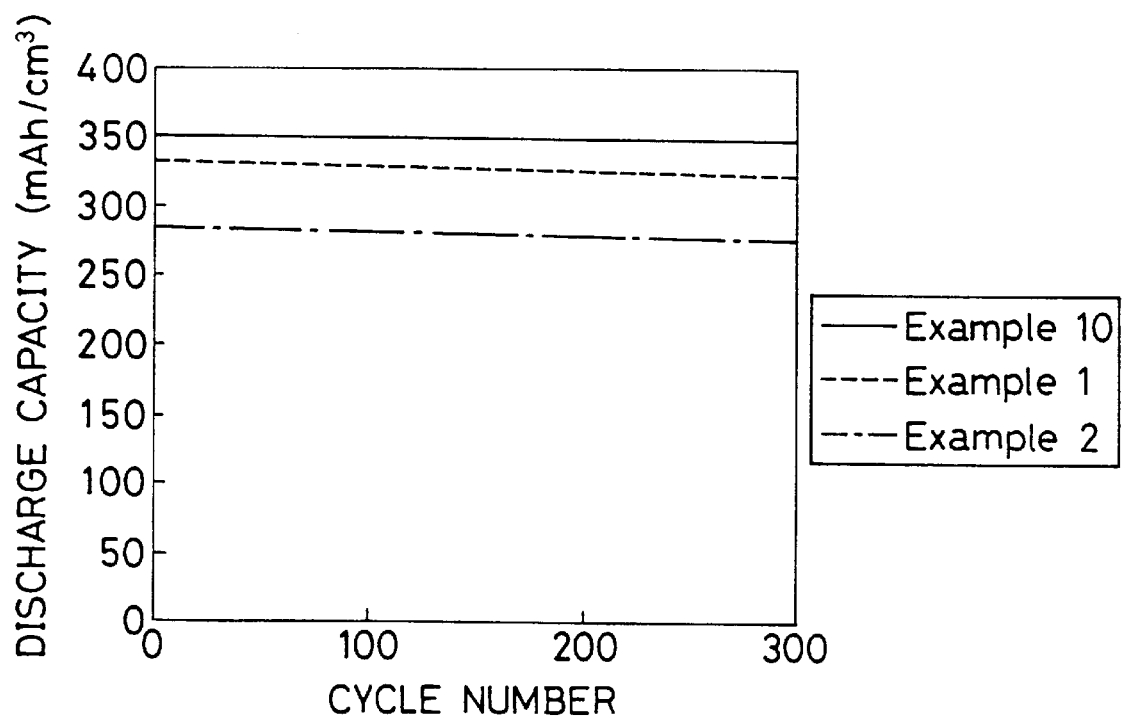

PROCESS FOR PREPARING CARBON ELECTRODE FOR NONAQUEOUS SECONDARY BATTERY

This is a division of application Ser. No. 08/625,889, filed Apr. 1,1996, now U.S. Pat. No. 5,723,232.

BACKGROUND OF THE INVENTION

1. Field of the Invention

The present invention relates to a carbon electrode for a nonaqueous secondary battery, a preparation process therefor and a nonaqueous battery using the same. More particularly, the invention relates to a carbon electrode for a nonaqueous secondary battery which is highly safe and ensures a high capacity and long lifetime, a preparation process therefor and a nonaqueous secondary battery using the same.

2. Related Art

As portable electronic systems, information systems and the like have been remarkably downsized and lightened, secondary batteries are important components for driving these devices. Among such secondary batteries, a lithium secondary battery has a light weight and high energy density. Therefore, the lithium secondary battery is a promising power source for the driving of a portable system and is now under intensive research and development.

In general, metalic lithium is employed as a negative electrode for the lithium secondary battery. However, a dendrite appears and grows on metalic lithium during repeated charge-discharge cycles, resulting in a short circuit within the secondary battery. This makes it difficult to use metalic lithium for the negative electrode for the secondary battery. To prevent the generation of the dendrite, a proposal has been made that a lithium alloy such as lithium-aluminum alloy is used for the negative electrode instead of metalic lithium. Even with the use of the lithium alloy, repeated charge-discharge cycles or exhaustive charge-discharge process may result in segregation of the alloy, making it difficult to obtain satisfactory charge-discharge cycle characteristics.

To cope with this problem, there have been proposed secondary batteries having negative electrodes which include carbon materials as a host and utilize a lithium-ion intercalation-deintercalation reaction. Such secondary batteries have been researched and developed, and some of them have been put into practical application. The lithium secondary batteries using the carbon materials for the negative electrodes thereof are excellent in the cycle characteristic and safety. However, the carbon materials have a variety of allotropic forms ranging from graphite to amorphous carbon, and the characteristic values thereof vary depending on the allotropic forms. The minute structures (including hexagonal net faces) of the carbon materials are also different depending on the allotropic forms. Various carbon materials have been proposed, as the allotropic forms, characteristic values and minute structures thereof significantly influence the characteristics of the resulting electrodes.

For example, negative electrodes using relatively amorphous carbon materials are disclosed in Japanese Unexamined Patent Publications No. 61-111907 (1986) and No. 62-90863 (1987). Negative electrodes using graphite carbon materials are disclosed in Japanese Unexamined Patent Publications No. 60-221964 (1985), No. 4-155776 (1992) and No. 4-115467 (1992). Negative electrodes using surface-treated graphite carbon materials are disclosed in Japanese unexamined Patent Publications No. 4-368778 (1992), No. 5-114421 (1993) and No. 5-121066 (1993). Negative electrodes using carbon materials having particular minute structures regardless of the crystallinity thereof are disclosed in Japanese Unexamined Patent Publications No. 4-280068 (1992) and No. 4-342958 (1992).

However, these carbon materials are all in the form of powder or fiber, thereby requiring a binder for the preparation of the carbon electrodes. Although the characteristics of the carbon materials are excellent, the electrodes using the carbon materials may not exhibit a desired cycle characteristic in practical applications.

Japanese Unexamined Patent Publications No. 60-36315 (1985) and No. 62-24555 (1987) propose processes for directly depositing a carbon material on a metal substrate to be used as a collector. The preparation of the carbon material is achieved by a vapor phase growth method. The carbon material prepared by the vapor phase growth method has excellent characteristics. Particularly, the carbon material directly deposited on the metal collector requires no binder, and exhibits an excellent conductivity. Therefore, an electrode using the carbon material has a high capacity and exhibits a highly stable cycle characteristic.

In Japanese Unexamined Patent Publications No. 59-188578 (1984) and No. 63-24585 (1988), there are disclosed a negative electrode carrying a catalytic substance for catalyzing the polymerization of a polymeric material and a negative electrode including a carbon material deposited on a catalytic substrate, respectively. In the former case, the polymeric material is used as a battery active material, and the catalytic substance is added to catalyze the polymerization of the polymeric material. Therefore, the function of the catalytic substance is different from that of a catalytic substance used in the present invention. In the latter case, the carbon material is graphitized to a greater extent and deposited tightly on the substrate at a low temperature. As is known to those skilled in the art, the negative electrode has a high capacity and exhibits an excellent cycle characteristic.

However, the carbon electrodes and preparation processes therefor described above suffer from several problems.

The chemical vapor deposition method involves a high cost and a difficulty in controlling the deposition of the carbon material to form a uniform film. Although the crystallinity of the carbon material can be improved by increasing the temperature for the deposition of the carbon material, the increased temperature makes it difficult to obtain a carbon electrode having a greater thickness.

Carbon electrodes which are prepared by impregnating a precursor of a carbon material into a metal collector of three-dimensional structure and then solidifying the carbon material are disclosed in Japanese Unexamined Patent Publications No. 4-92364 (1992) and No. 5-347155 (1993). In accordance with the preparation processes disclosed in these publications, the yield of the carbon material from the precursor is low, thereby making it difficult to obtain a high density carbon electrode. Where the metal collector is highly porous, it is difficult to sufficiently catalyze the precursor for carbonization thereof. Further, the precursor should be heat-treated at a temperature lower than a melting point of a metal used for the metal collector. Therefore, the crystallinity of the carbon material cannot be sufficiently increased, resulting in an unsatisfactory charge-discharge capacity of the resulting electrode.

The carbon material may be heat-treated for graphitization thereof after the preparation of the carbon electrode. However, the heat treatment should be performed at a temperature lower than the melting point of the metal used for the metal collector and, therefore, the carbon material cannot be sufficiently graphitized.

Another known carbon electrode uses a powdery active material such as graphite particles as a carbon material. The preparation of the carbon electrode involves a complicated process, in which a graphite material is prepared and pulverized into particles, then the graphite particles are mixed with an appropriate binder, and the mixture is applied on a collector. The carbon electrode using the graphite particles suffers from an irreversible capacity during an initial charge-discharge cycle, which makes it difficult to obtain a higher capacity battery.

To eliminate the irreversible capacity, there is reported a method in which surfaces of the graphite particles are chemically pretreated for reduction thereof, or the graphite particles are coated with an amorphous carbon material.

Such a method improves the initial charge-discharge efficiency, but involves an increased number of process steps for the preparation of the carbon electrode like the aforesaid case. Further, the carbon electrode includes a binder for binding the graphite particles and, hence, the energy density thereof cannot be satisfactorily increased. In addition, the resulting carbon electrode does not exhibit a satisfactory long-term cycle characteristic. Therefore, fundamental solutions to these problems have not been found yet.

SUMMARY OF THE INVENTION

The present invention provides a carbon electrode for a nonaqueous secondary battery which comprises a metal collector serving to catalyze carbon graphitization, graphite particles, and a carbon material having a lower crystallinity than the graphite particles, the graphite particles and the carbon material being sintered together on the metal collector or in the presence of the metal collector.

In accordance with another aspect of the present invention, it provides a nonaqueous secondary battery which comprises a negative electrode, a positive electrode, and an ion conductor, wherein the negative electrode is the aforesaid carbon electrode for a nonaqueous secondary battery.

In accordance with still another aspect of the present invention, it provides a process for preparing a carbon negative electrode for a nonaqueous secondary battery, which comprises the steps of: mixing graphite particles and a precursor of a carbon material; applying a mixture of the graphite particles and the precursor on a metal collector serving to catalyze carbon graphitization; and calcinating the metal collector to sinter the graphite particles and the carbon material on the metal collector or in the presence of the metal collector.

In accordance with further another aspect of the present invention, it provides a process for preparing a carbon negative electrode for a nonaqueous secondary battery, which comprises the steps of: filling graphite particles in a metal collector of three-dimensional structure serving to catalyze carbon graphitization; compacting the graphite particles to allow the graphite particles to be retained in the metal collector; impregnating a precursor of a carbon material into the metal collector; and calcinating the metal collector to sinter the graphite particles and the carbon material in the presence of the metal collector.

BRIEF DESCRIPTION OF THE DRAWINGS

FIG. 2 is a diagram illustrating the construction of a carbon electrode of Example 2;

FIG. 3 is a graphical representation illustrating cycle characteristics of carbon electrodes of Examples 1, 10 and 13;

DESCRIPTION OF THE PREFERRED EMBODIMENTS

Figure 1:
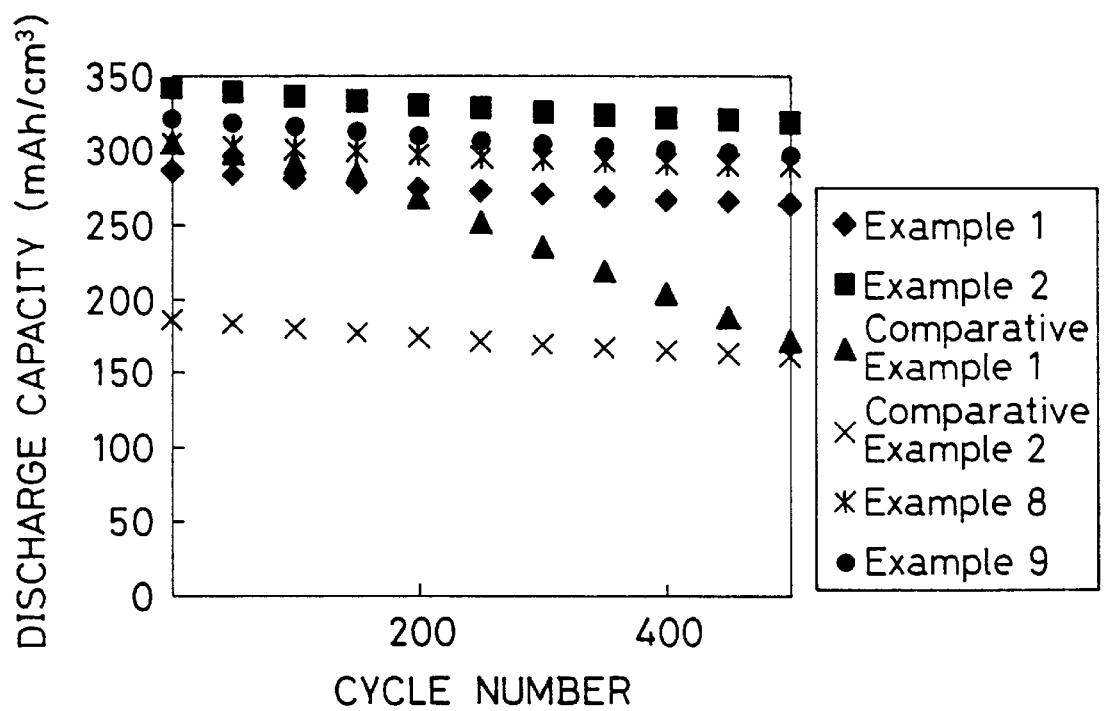
FIG. 1 is a graphical representation illustrating cycle characteristics of carbon electrodes of Examples 1, 2, 8 and 9 and Comparative Examples 1 and 2.

Examples of a metal material to be used for a metal collector which serves to catalyze carbon graphitization include iron, cobalt and nickel and alloys including at least one of these metals. Among these metals, nickel is the most suitable for the collector because nickel is rarely formed into a carbide, and is preferred in terms of cost. The metal collector is used in a plate form, mesh form, foamed form or fiber form. The metal collector in the mesh form, foamed form or fiber form is compacted for the formation of the metal collector. In accordance with the present invention, where the metal collector is in the plate form, a precursor of a carbon material (hereinafter referred to as "carbon precursor") is carbonized on the metal collector. Where the metal collector is in the mesh form, foamed form or fiber form, the carbon precursor is carbonized in the presence of the metal collector. The catalysis herein means an action to promote carbon graphitization during the process of the carbonization of the carbon precursor.

As a result of further study, the inventors of the present invention have found that a metal collector having a three-dimensional structure (such as obtained by compacting a metal material in a mesh form, foamed form or fiber form) is preferred because such a metal collector has greater capability of retaining graphite particles and a carbon material (i.e., the filling density of an active material is high). The use of the metal collector of three-dimensional structure provides for a carbon electrode having a more excellent cycle characteristic.

The three-dimensional structure preferably has a porosity of 60% to 95%. If the porosity is higher than 95%, the metal collector cannot exhibit a satisfactory current collecting effect nor a sufficient electrode strength. On the other hand, if the porosity is lower than 60%, the density of the active material included in a carbon electrode is reduced.

The three-dimensional structure is preferably formed of a matrix of a metal filament having a diameter of 20 $\mu$m to 200 $\mu$m. If the diameter is less than 20 $\mu$m, the metal filament itself is carbonized or disintegrated during the catalytic process to mingle with the graphite particles, thereby making the metal collector fragile. Therefore, the metal collector cannot exhibit a satisfactory current collecting effect nor a sufficient electrode strength. On the other hand, if the diameter is greater than 200 μm, the density of the active material included in the carbon electrode is reduced.

Major proportion of the charge-discharge capacity of the carbon electrode is attributable to the charge-discharge capacity of the sintered graphite particles. The graphite particles to be used in the present invention preferably have such characteristics that the mean interfacial spacing $d_{002}$ between (002) planes is 0.335 nm to 0.340 nm, the crystallite size Lc in the (002) plane direction is not less than 10 nm and the crystallite size La in the (110) plane direction is not less than 10 nm, which are determined by the X-ray wide-angle diffraction analysis. Such graphite particles provide for a carbon electrode having a high capacity.

Factors that influence the capacity and charge-discharge potential of a battery include the characteristics relating to the layer structure of graphite particles, that is, the interfacial spacing $d_{002}$ between (002) planes (i.e., interlayer spacing) and crystallite size.

Graphite particles having a higher crystallinity are expected to provide for a higher-capacity carbon electrode, because a potential produced when lithium is deintercalated from such graphite particles is close to the potential of lithium. In consideration of the battery capacity expected to be available when the resulting carbon electrode is used in a lithium secondary battery, the mean interfacial spacing $d_{002}$ between (002) planes of the graphite particles is preferably 0.335 nm to 0.340 nm which is determined by the X-ray wide-angle diffraction analysis. Where the crystallite sizes Lc and La are less than 10 nm, the crystallinity is low and, hence, the battery capacity expected to be available when the resulting carbon electrode is used in a lithium secondary battery is low.

Exemplary graphite materials that satisfy the requirements for the aforesaid characteristics include natural graphite, Kish graphite, synthetic graphite obtained from graphitizing carbons such as petroleum coke or coal pitch coke, and expanded graphite. The graphite particles may be in a spherical, scale or fiber form, or may be those obtained by pulverizing the graphite particles in such a form. Particularly, the spherical- or scale-form graphite particles and those obtained by pulverizing the graphite particles in such a form are preferred.

The size of the graphite particles is preferably not greater than 80 μm, which is determined as a peak particle size in a particle size distribution obtained by a laser diffraction particle size analyzer (SHIMADZU Co. SALD-1100). The use of graphite particles having a particle size of greater than 80 μm is not preferable because this may result in a reduced amount of effectively available graphite particles, decreased diffusion of lithium into the graphite particles and reduced reaction sites on the graphite particles.

A carbon material which is to be used to cover at least part of the graphite particles and the metal collector and sintered together with the graphite particles may have a lower crystallinity than the graphite particles. The use of such a carbon material improves the initial charge-discharge efficiency in comparison with a carbon electrode comprised of graphite particles alone. The carbon material preferably has such characteristics that the mean interfacial spacing $d_{002}$ between (002) planes is not less than 0.337 nm, the crystallite size Lc in the (002) plane direction is not greater than 10 nm and the crystallite size La in the (110) plane direction is not greater than 10 nm, which are determined by the X-ray wide-angle diffraction analysis. Sintering conditions are preferably controlled so that the carbon material can satisfy the requirements for the aforesaid characteristics. The characteristic values of the carbon material herein mean those determined when the carbon precursor not mixed with the graphite particles is sintered to be formed into a carbon electrode under the same conditions (employing the same catalyst, heat treatment temperature and heat treatment period) as in a case where the carbon precursor is mixed with the graphite particles for the formation of the carbon electrode.

The content of the carbon material bound to the graphite particles after the calcination of the carbon precursor is preferably not greater than 50% by weight with respect to the graphite particles to obtain a desired discharge capacity. The lower limit of the content of the carbon material is not particularly specified, but the content may be such that the graphite particles and the metal collector can have a sufficient strength to withstand an electrode reaction.

The graphite particles exhibit a generally constant potential characteristic, while the sintered carbon material having a low crystallinity exhibits a gradient potential characteristic. Therefore, the potential curve of the carbon electrode can be controlled by adjusting the weight ratio of the carbon material to the graphite particles. For the purpose of controlling the potential curve, the content of the sintered carbon material may exceed 50% by weight.

The carbon electrode is prepared, for example, in the following manner. A liquid or solid carbon precursor and graphite particles are mixed in a given solvent. After a given part of the metal collector is coated with the resulting mixture by a coating or dipping method, the coating is calcinated in an inert atmosphere such as of nitrogen or argon. Thus, the carbon electrode is prepared.

The carbon electrode may otherwise be prepared in the following manner. The graphite particles are filled in a given part of the metal collector, and compacted to be retained therein. A liquid carbon precursor or a solid carbon precursor dissolved or dispersed in a solvent is impregnated into the metal collector, and then the resulting metal collector is calcinated in an inert atmosphere such as of nitrogen or argon.

The latter preparation method is more preferable, because the graphite particles and the carbon material can be retained in the metal collector in a homogeneous state thereby minimizing the variation in the characteristics of the resulting carbon electrode. Thus, the reliability of a secondary battery employing the carbon electrode can be improved.

The carbon material is prepared by a liquid-phase carbonization process or a solid-phase carbonization process. Where a liquid carbon precursor is used, the carbon precursor is directly mixed with the graphite particles or impregnated into the metal collector filled with the graphite particles. Alternatively, the carbon precursor can be dissolved in an appropriate solvent to control the weight ratio, viscosity or the like of the carbon precursor before the mixing or the impregnation. Where a solid carbon precursor such as a polymer is used, the carbon precursor is preferably heated into a molten state or dissolved in an appropriate solvent, and then mixed with the graphite particles or impregnated into the metal collector filled with the graphite particles.

In the liquid-phase carbonization process, a raw carbon material (carbon precursor) such as tar or pitch is heat-treated in an inert atmosphere to be carbonized in a liquid phase for the preparation of the carbon material. The temperature raising rate and the pressure increase/reduction conditions for the heat treatment may be suitably controlled depending on the kind of the carbon precursor to be used.

In the solid-phase carbonization process, a polymeric material such as polyvinylidene fluoride or a like carbon precursor is heat-treated and solidified for the preparation of the carbon material. The temperatures for the formation and carbonization of the carbon material vary depending on the kind of the carbon precursor to be used and the method of forming the carbon material, but may be any temperature between the melting point of the catalytic metal and the lowest temperature at which the carbon material can be formed.

Where the carbon material is formed in the liquid-phase carbonization process or in the solid-phase carbonization process, the carbon precursor may be heated at a temperature of 200° C. to 400° C. (which depends on the kind of the carbon precursor to be used) in an activated atmosphere such as of air for an anti-flaming treatment or an anti-melting treatment before the formation of the carbon material.

Examples of the solvent to be added to the carbon precursor include quinoline, benzene, tetrachloromethane, N-methyl-2-pyrrolidone and tetrahydrofuran.

In accordance with the preparation process for the carbon electrode, the carbon graphitization can be achieved simply by heat-treating the carbon precursor in an inert atmosphere. Since the metal collector serves to catalyze the carbon graphitization, the heat treatment can be performed at a relatively low temperature, and the resultant metal collector including the graphite particles and the carbon material can be used as a carbon electrode without the need for an additional process step. Therefore, the preparation process for the carbon electrode can be simplified and the preparation cost can be reduced.

Where the carbon electrode thus prepared is used for a nonaqueous secondary battery, side reactions such as decomposition of an ion conductor can be suppressed, thereby improving the initial charge-discharge efficiency. Since the graphite particles are directly bound by the carbon material serving as an active material on the metal collector or in the presence of the metal collector, the resulting secondary battery has an increased energy density and an improved cycle characteristic.

Since side reactions are suppressed and the surfaces of the graphite particles are coated with the carbon material having a low crystallinity as previously described, the intercalation and deintercalation of lithium can readily occur. Further, the carbon material having a low crystallinity alleviates the expansion and contraction of the graphite particles which may occur in association with the intercalation and deintercalation of lithium and, therefore, imparts a mechanical strength to the carbon electrode. Since the carbon electrode includes no binder, the carbon electrode can be dried at a temperature in a wider range. Therefore, the time required for drying the carbon electrode can be shortened by employing a higher temperature for the drying.

In accordance with the present invention, there is provided a nonaqueous secondary battery including at least a negative electrode, a positive electrode and an ion conductor, wherein the aforesaid carbon electrode is employed as the negative electrode.

The positive electrode to be used in the nonaqueous secondary battery of the present invention includes a positive-electrode active material, a conductive material, a binder and, if necessary, a solid electrolyte.

Usable as the positive-electrode active material are lithium-containing oxides. Examples of such lithium-containing oxides include those having the composition formula $Li_xM_yN_zO_2$ (wherein M represents Fe, Co, Ni or Mn; N represents a transition metal, preferably an element of group IVB or VB; $0 \leq x \leq 1$; $0 \leq y \leq 1$; and $0 \leq z \leq 1$) such as $LiVO_2$, $LiCoO_2$, $LiNiO_2$, $LiFeO_2$ and $LiMnO_2$. Other examples thereof include those having the composition formula $LiMn_{2-x}N_yO_4$ (wherein N represents a transition metal, preferably an element of group IVB or VB; $0 \leq x \leq 2$; and $0 \leq y \leq 1$) such as $LiMn_2O_4$.

Exemplary conductive materials include such carbon materials as carbon blacks (acetylene black, thermal black, channel black and the like), graphite powder, metal powder, but not limited thereto.

Exemplary binders include fluoropolymers such as polytetrafluoroethylene and polyvinylidene fluoride, polyolefin polymers such as polyethylene and polypropylene, and synthetic rubbers, but not limited thereto.

The mixing ratio is about 5 to 50 parts by weight of the conductive material and about 1 to 30 parts by weight of the binder with respect to 100 parts by weight of the active material. If the proportion of the conductive material is less than 5 parts by weight or the proportion of the binder is greater than 30 parts by weight, a practical lithium secondary battery cannot be fabricated, because the resistance or polarization of the positive electrode is increased thereby decreasing the discharge capacity. If the proportion of the conductive material is greater than 50 parts by weight (which may vary depending on the kind of the conductive material to be blended), the discharge capacity is undesirably reduced, because the relative content of the active material in the positive electrode is reduced. If the proportion of the binder is less than 1 part by weight, the binding ability is lost. If the proportion of the binder is greater than 30 parts by weight, the relative content of the active material in the positive electrode is reduced, like the case of the binder. Further, the resistance or polarization of the electrode is increased as described above, so that the discharge capacity thereof is undesirably reduced. Thus, the resulting lithium secondary battery is not suitable for practical use. When the positive electrode is prepared, a heat treatment is preferably performed at a temperature around the melting point of the binder to increase the binding ability of the binder.

Exemplary ion conductors for use in the lithium secondary battery include organic electrolytic solutions, solid polymer electrolytes, solid inorganic electrolytes and molten salts, among which the organic electrolytic solutions are particularly preferred.

Examples of specific electrolytes for the organic electrolytic solutions include such lithium salts as lithium perchlorate, lithium borofluoride, lithium hexafluorophosphate, arsenic lithium hexafluoride, lithium trifluoromethane sulfonate, lithium halides and lithium chloroaluminate. These electrolytes may be used either alone or as a mixture thereof.

Examples of specific solvents for the organic electrolytic solution include such esters as propylene carbonate, ethylene carbonate, butylene carbonate, diethyl carbonate, dimethyl carbonate, methylethyl carbonate, τ-butyrolactone, methyl formate and methyl acetate, such ethers as dioxolane, diethyl ether, dimethoxyethane, diethoxyethane, methoxyethoxyethane, tetrahydrofuran and 2-methyltetrahydrofuran, dimethylsulfoxide, sulfolane, methylsulfolane and acetonitrile. These solvents may be used either alone or as a mixture. The organic electrolytic solution can be prepared by dissolving the electrolyte in any of the aforesaid solvents. It should be noted that the solvent and electrolyte to be used for the preparation of the organic electrolytic solution are not limited to those described above.

A separator is used to retain the ion conductor. Exemplary materials of the separator include nonwoven fabrics and woven fabrics of electrically-insulating synthetic resin fibers, glass fibers and natural fibers, and compacts of alumina powder and the like. Among these, nonwoven fabrics of synthetic resin fibers such as of polyethylene and polypropylene are particularly preferred in terms of the quality stability. A separator made of a nonwoven fabric of any of such synthetic resin fibers may be adapted to isolate the positive electrode from the negative electrode when the battery is abnormally heated to cause the separator to be fused. From the viewpoint of safety, the nonwoven fabrics of the synthetic resin fibers are preferably used. The thickness of the separator is not particularly limited as long as the separator can retain a required amount of ion conductor and prevent the short-circuit between the positive electrode and the negative electrode, but may be about 0.01 mm to about 1 mm, preferably about 0.02 mm to about 0.05 mm.

The secondary battery of the present invention described above has a high energy density and is excellent in the cycle characteristic and safety.

EXAMPLES

The present invention will hereinafter be described in detail by way of examples thereof.

In the following examples, the crystallite sizes Lc, La were determined by the X-ray wide-angle diffraction analysis in a known manner such as described in Carbon Material Experimental Technology Vol. 1, pp. 55–63 (compiled by Association of Carbon Materials and published by Science and Technology Co., Ltd.) or in Japanese Unexamined Patent Publication No. 61-111907 (1986). The form factor K employed for the determination of the crystallite size was 0.9. The size of graphite particles was determined as a peak particle size in a particle size distribution obtained by using a laser diffraction particle size distribution analyzer.

Example 1

Where a liquid carbon precursor such as pitch is employed, in general, graphite particles may be directly blended with the liquid carbon precursor. Alternatively, the viscosity of the carbon precursor may be adjusted by adding an appropriate solvent.

In Example 1, a nickel foil having an area of 4×2 cm$^2$ and a thickness of 50 μm was used as a metal collector serving as a catalyst. Natural graphite particles (produced in Madagascar, flake, particle size: 11 μm, $d_{002}$: 0.337 nm, Lc: 27 nm, La: 17 nm, specific surface area: 8 m$^2$/g) was mixed with a quinoline-soluble component of pitch (carbon precursor) in a weight ratio of 95:25.

The mixture was applied in an area of 2×2.5 cm$^2$ on the metal collector of the nickel foil. In turn, the metal collector was calcinated at 300° C. for two hours in an atmosphere of nitrogen, and then at 1000° C. for five hours to obtain a carbon electrode. When the quinoline-soluble component of pitch was calcinated under the same conditions, the carbon yield was 20%.

The weight ratio between the graphite particles and the carbon material bound to the graphite particles in the obtained carbon electrode was 95:5. The total amount of carbon (including carbon contained in the graphite particles and the carbon material covering the graphite particles) in the carbon electrode was 117.2 mg, and the thickness of the carbon electrode was 276.4 μm. The amount of carbon in a unit volume of the carbon electrode (hereinafter referred to as "active-substance density of the electrode") was 0.85 g/cm$^3$.

A collector tab was attached to the obtained carbon electrode to prepare a test electrode. Then, the test electrode was dried under a reduced pressure at 150° C. for five hours. The test electrode was evaluated by way of the three-electrode method using lithium metal as a counter electrode and a reference electrode. An ion conductor used in an evaluation test was prepared by dissolving 1 mol/dm$^3$ lithium perchlorate in a solvent mixture containing ethylene carbonate and diethyl carbonate in a ratio of 1:1. A charge-discharge test was performed by initially charging up to 0 V at a current density of 30 mA/g, and then discharging to 1.5 V. The cycle characteristic of the carbon electrode was thus evaluated. The result is shown in FIG. 1.

Example 2

A foamed nickel substrate having an area of 4×2 cm$^2$ was used as a metal collector serving as a catalyst. Similarly to Example 1, a quinoline-soluble component of pitch was used as a carbon precursor, and natural graphite particles (produced in Madagascar, flake, particle size: 11 μm, $d_{002}$: 0.337 nm, Lc: 27 nm, La: 17 nm, specific surface area: 8 m$^2$/g) were used.

The carbon precursor and the graphite particles were mixed in a weight ratio of 25:95. The mixture was filled in the foamed nickel substrate, which was calcinated under the same conditions as in Example 1 to obtain a carbon electrode. The obtained carbon electrode had a structure as shown in FIG. 2. An enlarged view A of FIG. 2 shows the carbon electrode, in which reference numerals 15, 16 and 17 represent the foamed nickel, the carbon material having a low crystallinity and the graphite particles, respectively. As can be seen from FIG. 2, the graphite particles 17 diffused into pores of the foamed nickel 15, and the foamed nickel 15 and the graphite particles 17 were coated and bound with the carbon material 16 having a low crystallinity.

The electrode was prepared and evaluated in substantially the same manner as in Example 1, except that a solvent mixture containing propylene carbonate and ethylene carbonate in a ratio of 1:1 was used for an ion conductor. The result is shown in FIG. 1.

Comparative Example 1

Natural graphite particles (produced in Madagascar, flake, particle size: 11 μm, $d_{002}$: 0.337 nm, Lc: 27 nm, La: 17 nm, specific surface area: 8 m$^2$/g) were used.

A binder was prepared by dissolving 10 parts by weight of polyvinylidene fluoride relative to 100 parts by weight of the graphite particles in a solvent of N-methyl-2-pyrrolidone. The graphite particles serving as an active material were added to the binder solution and mixed to prepare an active material paste. The obtained paste was applied on the opposite sides of a copper foil collector and dried at 60° C. Then, the active material paste on the collector was heat-treated at 240° C. to completely remove the solvent of N-methyl-2-pyrrolidone and to increase the binding ability of the binder and, thus, a carbon electrode was obtained. The obtained carbon electrode was pressed, and further dried at 200° C. under a reduced pressure to remove moisture. Thus, a test electrode was obtained.

The test electrode had a surface area of 5 cm$^2$, a thickness of 135 μm (thickness of the collector: 50 μm) and an active-substance density of 0.92 g/cm$^3$. The test electrode thus obtained was evaluated in the same manner as in Example 1.

Comparative Example 2

A quinoline-soluble component of pitch was impregnated into a foamed nickel substrate, which was calcinated under the same conditions as in Example 1 to obtain a carbon electrode. The obtained carbon electrode was pressed to obtain a test electrode. The test electrode had a thickness of 324 μm and an active-substance density of 0.42 g/cm³. The test electrode thus obtained was evaluated in the same manner as in Example 1. The result is shown in FIG. 1.

Example 3

A carbon electrode was prepared in substantially the same manner as in Example 2, except that graphite particles and a quinoline-soluble component of pitch (carbon precursor) were mixed in a weight ratio of 85:75. The weight ratio between the graphite particles and the carbon material bound to the graphite particles in the carbon electrode was 85:15. The carbon electrode was evaluated in the same manner as in Example 1. The result is shown in Table 1.

Example 4

A carbon electrode was prepared in substantially the same manner as in Example 2, except that graphite particles and a quinoline-soluble component of pitch (carbon precursor) were mixed in a weight ratio of 75:125. The weight ratio between the graphite particles and the carbon material bound to the graphite particles in the carbon electrode was 75:25. The carbon electrode was evaluated in the same manner as in Example 1. The result is shown in Table 1.

Example 5

A carbon electrode was prepared in substantially the same manner as in Example 2, except that graphite particles and a quinoline-soluble component of pitch (carbon precursor) were mixed in a weight ratio of 65:175. The weight ratio between the graphite particles and the carbon material bound to the graphite particles in the carbon electrode was 65:35. The carbon electrode was evaluated in the same manner as in Example 1. The result is shown in Table 1.

Example 6

A carbon electrode was prepared in substantially the same manner as in Example 2, except that graphite particles and a quinoline-soluble component of pitch (carbon precursor) were mixed in a weight ratio of 60:200. The weight ratio between the graphite particles and the carbon material bound to the graphite particles in the carbon electrode was 60:40. The carbon electrode was evaluated in the same manner as in Example 1. The result is shown in Table 1.

Example 7

A carbon electrode was prepared in substantially the same manner as in Example 2, except that graphite particles and a quinoline-soluble component of pitch (carbon precursor) were mixed in a weight ratio of 55:225. The weight ratio between the graphite particles and the carbon material bound to the graphite particles in the carbon electrode was 55:45. The carbon electrode was evaluated in the same manner as in Example 1. The result is shown in Table 1.

Comparative Example 3

A carbon electrode was prepared in substantially the same manner as in Example 2, except that graphite particles and a quinoline-soluble component of pitch (carbon precursor) were mixed in a weight ratio of 45:275. The weight ratio between the graphite particles and the carbon material bound to the graphite particles in the carbon electrode was 45:65.

The carbon electrode was evaluated in the same manner as in Example 1. The result is shown in Table 1.

Comparative Example 4

A carbon electrode was prepared in substantially the same manner as in Example 2, except that spherical carbon material (particle size: 6 μm, $d_{002}$: 0.342 nm, Lc: 1.8 nm, La: 1.2 nm, specific surface area: 5 m²/g) instead of a graphite particles were used. The carbon electrode had a thickness of 345 μm and an active-substance density of 0.65 g/cm³. The carbon electrode was evaluated in the same manner as in Example 1. The result is shown in Table 1.

TABLE 1

|  | Electrode Thickness | Active Substance Density in Electrode | Discharge Capacity (mAh/cm³) |
|---|---|---|---|
| Example 2 | 350.2 | 1.12 | 342 |
| Example 3 | 342.6 | 1.05 | 331 |
| Example 4 | 338.2 | 1.01 | 318 |
| Example 5 | 361.3 | 0.92 | 298 |
| Example 6 | 348.5 | 0.88 | 274 |
| Example 7 | 344.1 | 0.81 | 248 |
| Example 8 | 220 | 0.86 | 302 |
| Example 9 | 315 | 0.92 | 328 |
| Comparative Example 2 | 324.6 | 0.42 | 186 |
| Comparative Example 3 | 318.1 | 0.61 | 192 |
| Comparative Example 4 | 311.5 | 0.72 | 167 |

Examples 2 to 7 and Comparative Example 3 indicate that carbon electrodes containing graphite particles in a weight ratio of higher than 50% are preferred because such carbon electrodes have high capacity densities. Further, Comparative Examples 2 and 4 indicate that the capacity density is reduced when carbon having a low crystallinity is used instead of graphite particles.

Example 8

A stainless steel foil (SUS302 available from NILACO Inc.) having a thickness of 50 μm was used for a metal collector serving as a catalyst, and spherical graphite particles (particle size: 6 μm, $d_{002}$: 0.337 nm, Lc: 13 nm, La: 11 nm, specific surface area: 8 m²/g) were used. Polyvinylidene fluoride (carbon precursor) was dissolved in N-methyl-2-pyrrolidone. The graphite particles were added to the polyvinylidene fluoride solution and mixed to obtain a paste. The paste was applied on a metal collector and allowed to stand at 300° C. for two hours in a stream of nitrogen. Thereafter, the temperature was raised up to 1000° C., and the paste was allowed to stand at 1000° C. for three hours. Thus, a carbon electrode was obtained.

The carbon electrode was evaluated in substantially the same manner as in Example 1, except that an ion conductor was prepared by dissolving 1 mol/dm³ lithium perchlorate in a solvent mixture containing ethylene carbonate and τ-butyrolactone in a ratio of 1:1. The result is shown in FIG. 1.

Example 9

A foamed nickel substrate having an area of 4×2 cm² was used as a metal collector serving as a catalyst, and synthetic graphite particles (KS-25 available from Lonza Inc., flake, particle size: 8 μm, $d_{002}$: 0.336 nm, Lc: 25 nm, La: 16 nm, specific surface area: 12 m²/g) were used. Vinyl chloride resin powder (carbon precursor) was dissolved in tetrahydrofurane, and the graphite particles were added to the solution and mixed. The mixture was impregnated into the foamed nickel substrate, and the resulting substrate was calcinated under the same conditions as in Example 1 to obtain a carbon electrode. The obtained carbon electrode was evaluated in the same manner as in Example 1. The result is shown in FIG. 1.

The characteristic values of the graphite particles, the types of carbon precursors and the weight ratios between the graphite particles and the carbon materials after the calcination (graphite particles:carbon material) in Examples 1 to 9 and Comparative Examples 1 to 4 are collectively listed in Table 2.

TABLE 2

| | Graphite Particles | | | Carbon Precursor | Weight Ratio after the Calcination Graphite Particles:Material |
|---|---|---|---|---|---|
| | d002 | La | Lc | | |
| Example 1 | 0.337 | 17 | 27 | pitch | 95:5 |
| Example 2 | 0.337 | 17 | 27 | pitch | 95:5 |
| Comparative Example 1 | 0.337 | 17 | 27 | — | — |
| Comparative Example 2 | — | — | — | pitch | 0:100 |
| Example 3 | 0.337 | 17 | 27 | pitch | 85:15 |
| Example 4 | 0.337 | 17 | 27 | pitch | 75:25 |
| Example 5 | 0.337 | 17 | 27 | pitch | 65:35 |
| Example 6 | 0.337 | 17 | 27 | pitch | 60:40 |
| Example 7 | 0.337 | 17 | 27 | pitch | 55:45 |
| Comparative Example 3 | 0.337 | 17 | 27 | pitch | 45:55 |
| Comparative Example 4 | 0.342 | 1.3 | 1.8 | pitch | 95:5 |
| Example 8 | 0.337 | 11 | 13 | PVDF | 96:4 |
| Example 9 | 0.336 | 16 | 25 | Vinyl Chloride | 96:4 |

Comparative Example 1 was used to compare the carbon electrode of the present invention with a carbon electrode prepared in accordance with a conventional preparation process. Comparative Example 2 was used to compare the carbon electrode of the present invention with a carbon electrode including no graphite particle. Examples 3 to 7 and Comparative Examples 3 and 4 were used to determine an optimum weight ratio between the graphite particles and the carbon material. In Examples 8 and 9, the carbon precursors used for the preparation of the carbon electrodes were different from that used in Example 1.

Example 10

A foamed nickel substrate having an area of 4×2 cm$^2$ and a porosity of 80% and formed of a nickel filament having a diameter of 50 μm was used as a metal collector serving as a catalyst. Graphite particles (produced in Madagascar, flake, particle size: 11 μm, $d_{002}$: 0.337 nm, Lc: 27 nm, La: 17 nm, specific surface area: 8 m$^2$/g) were mixed with a quinoline-soluble component of pitch (carbon precursor) in a weight ratio of 90:50.

The mixture was filled in the metal collector of the foamed nickel substrate. In turn, the metal collector was calcinated at 300° C. for two hours in an atmosphere of nitrogen, and then at 1000° C. for five hours. The calcinated body was compressed to obtain a carbon electrode. When only the quinoline-soluble component of pitch was calcinated under the same conditions, the carbon yield was 20%.

The weight ratio between the graphite particles and the carbon material bound to the graphite particles in the obtained carbon electrode was 9:1. The total amount of carbon (including carbon contained in the graphite particles and the carbon material covering the graphite particles) in the carbon electrode was 102.3 mg, and the thickness of the carbon electrode was 116.5 μm. The active-substance density of the electrode was 1.10 g/cm$^3$.

A collector tab was attached to the obtained carbon electrode to prepare a test electrode. Then, the test electrode was dried under a reduced pressure at 150° C. for five hours. The test electrode was evaluated by way of the three-electrode method using lithium plates as a counter electrode and a reference electrode. An ion conductor used in an evaluation test was prepared by dissolving 1 mol/dm$^3$ lithium perchlorate in a solvent mixture containing ethylene carbonate and diethyl carbonate in a ratio of 1:1. A charge-discharge test was performed by initially charging up to 0 V at a current density of 30 mA/g, and then discharging to 1.5 V. The cycle characteristic of the carbon electrode was thus evaluated. The result is shown in FIG. 3 in which the cycle characteristic of the carbon electrode obtained in Example 1 is also shown for comparison.

The density of the active material included in a carbon electrode can be increased by using a metal collector of three-dimensional structure and, thus, the resulting carbon electrode has a higher capacity density as shown in FIG. 3. Since the amount of released carbon can be reduced, the carbon electrode exhibits an excellent cycle characteristic.

Example 11

Carbon electrodes were prepared in substantially the same manner as in Example 10, except that metal collectors having porosities of 96%, 93%, 70%, 60% and 55% (the average diameters of the metal filaments: 50 μm) were used.

Figure 4:
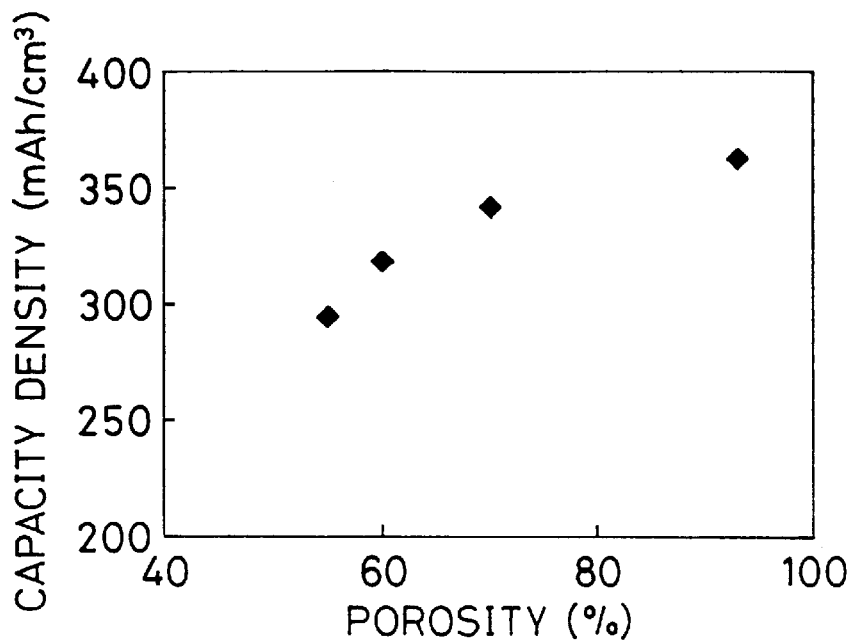
FIG. 4 is a graphical representation illustrating the relationship between the porosity of a metal collector and the capacity density of carbon electrodes of Example 11.

The capacity density of each of the carbon electrodes was measured in the same manner as in Example 10. The results are shown in FIG. 4. The carbon electrode having a metal collector with a porosity of 96% was crushed when compressed and, therefore, the capacity density thereof could not be measured.

Example 12

Carbon electrodes were prepared in substantially the same manner as in Example 10, except that metal collectors were respectively formed of metal filaments having average diameters of 15 μm, 30 μm, 100 μm, 180 μm and 220 μm (the porosities of metal collectors: 85%).

Figure 5:
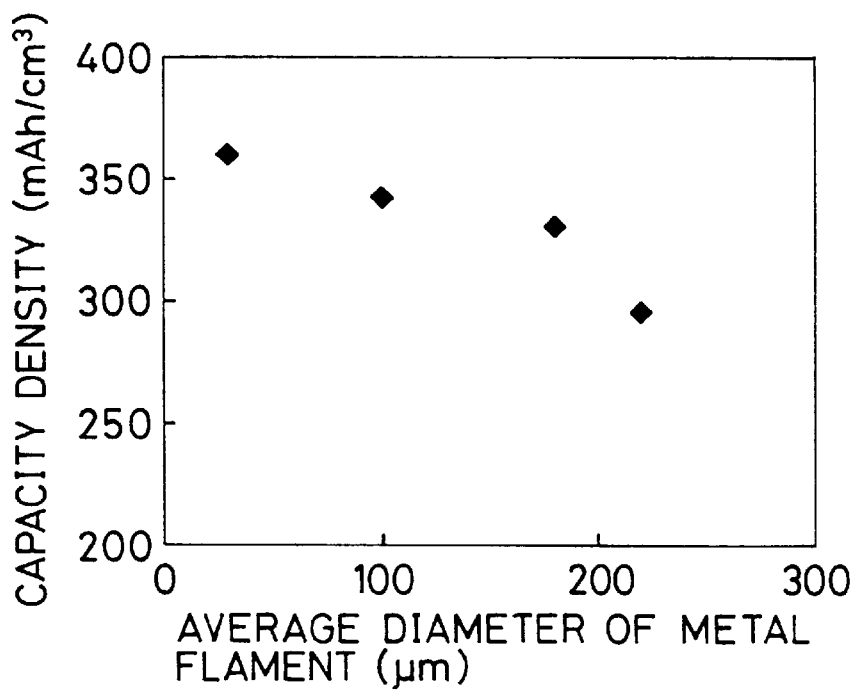
FIG. 5 is a graphical representation illustrating the relationship between the average diameter of a metal filament of a metal collector and the capacity density of carbon electrodes of Example 12.

The capacity density of each of the carbon electrodes was measured in the same manner as in Example 10. The results are shown in FIG. 5. The carbon electrode having a metal collector formed of a metal filament having a diameter of 15 μm was crushed when compressed and, therefore, the capacity density thereof could not be measured.

As can be understood from Examples 11 and 12, the carbon electrode which included metal collector of three-dimensional structure having a porosity of 60% to 95% and/or formed of a metal filament having an average diameter of 20 μm to 200 μm had a sufficient strength and a high capacity density (greater than 300 mAh/cm$^3$).

Example 13

Graphite particles (produced in Madagascar, flake, particle size: 11 μm, $d_{002}$: 0.337 nm, Lc: 27 nm, La: 17 nm, specific surface area: 8 m$^2$/g) were filled in a metal collector having the same construction as in Example 10, and compacted therein so that the graphite particles were retained in the metal collector of three-dimensional structure. A quinoline-soluble component of pitch (carbon precursor) was impregnated into the metal collector retaining the graphite particles. Then, a carbon electrode was obtained in the same manner as in Example 10.

The weight ratio between the graphite particles and the carbon material bound to the graphite particles in the obtained carbon electrode was 9:1, which was calculated from a change in the weight of the carbon electrode. The total amount of carbon in the carbon electrode (including carbon contained in the graphite particles and the carbon material covering the graphite particles) was 115.3 mg, and the thickness of the carbon electrode was 112.6 $\mu$m. The active-substance density of the electrode was 1.28 g/cm$^3$.

The obtained carbon electrode was evaluated in the same manner as in Example 10. The result in shown in FIG. 3.

As can be seen from FIG. 3, the carbon electrode obtained by the preparation process of Example 13 had the carbon material penetrating into the inside thereof and, therefore, reduction in the capacity density during the cycle test was suppressed. Comparison of Example 13 with Example 10 indicates that the carbon electrode of Example 13 had the carbon material penetrating more deeply into the inside thereof than the carbon electrode of Example 10. This implies that the reduction in the capacity density can be suppressed because the amount of the carbon material fallen out during the repeated charge-discharge process is reduced.

Example 14

In general, a positive electrode is prepared by blending a conductive material and a binder with a positive-electrode active material. Usable as the conductive material are carbon materials such as carbon black and graphite, and metal materials such as metal power and metal wool. The binder may be blended in a powder form with the positive-electrode active material or blended after being dispersed or dissolved in a solvent to enhance the dispersibility and binding ability of the binder. Where the binder dispersed or dissolved in the solvent is used, the solvent has to be thereafter removed by way of vacuum treatment or heat treatment. The binding ability of a certain binder may be increased by heat treatment at a temperature around the melting point of the binder.

In Example 14, 10 parts by weight of acetylene black (conductive material) and 10 parts by weight of polytetrafluoroethylene powder (binder) were mixed with 100 parts by weight of LiCoO$_2$ (positive-electrode active material), and the mixture was formed into a 15 mm$\Phi$ pellet to obtain a positive electrode. The thickness of the positive electrode was 0.8 mm.

Figure 6:
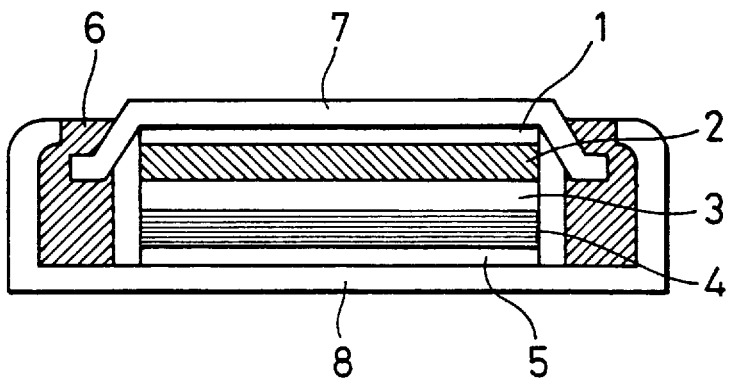
FIG. 6 is a vertical sectional view illustrating a coin-type battery according to the present invention.

An ion conductor was prepared by dissolving 1 mol/dm$^3$ LiPF$_6$ in a solvent mixture containing ethylene carbonate and diethyl carbonate in a ratio of 1:1. A polypropylene nonwoven fabric was used as a separator. A carbon electrode prepared in the same manner as in Example 2 and stamped into a size of 15 mm$\Phi$ was used as a negative electrode (thickness: 0.5 mm). A coin-type battery (diameter: 20 mm, thickness: 20 mm) having a construction as shown in FIG. 6 was fabricated by using the aforesaid components.

Figure 7:
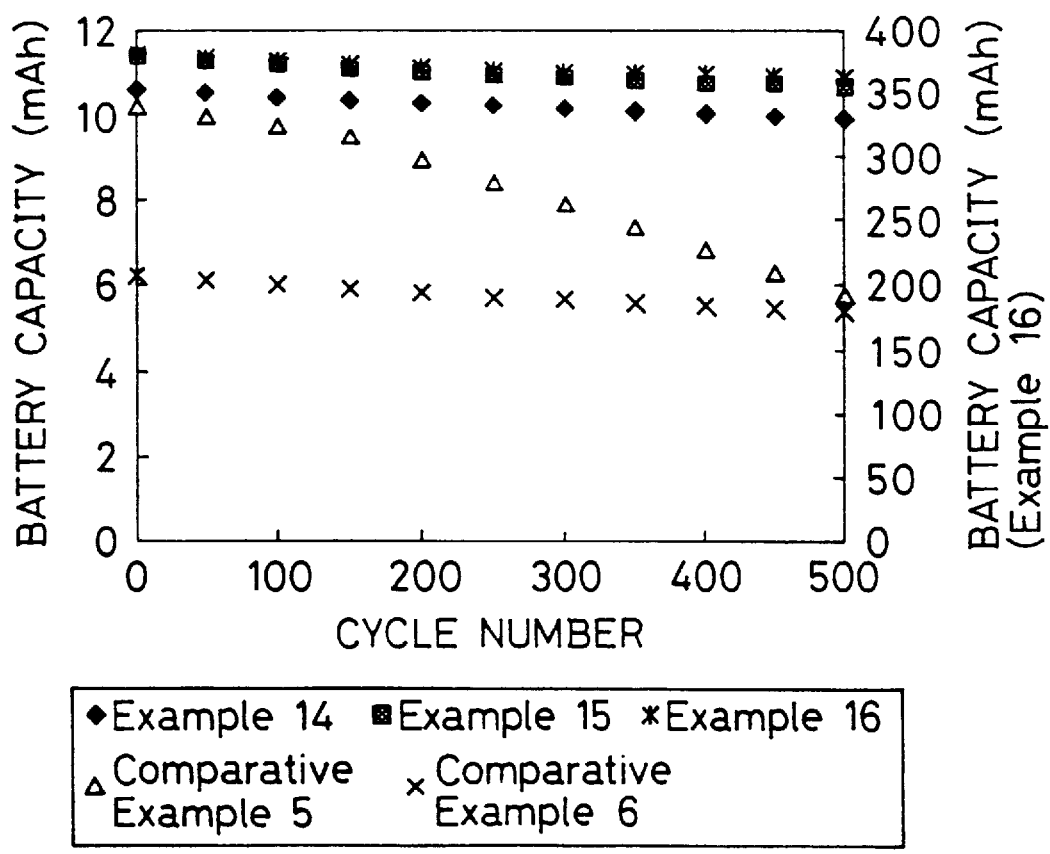
FIG. 7 is a graphical representation illustrating cycle characteristics of batteries of Examples 14 to 16 and Comparative Examples 5 and 6.

A charge-discharge test was performed on the battery thus fabricated at a constant current of 1 mA in a charge-discharge potential range between 2.7V and 4.1V. It should be noted that the positive electrode was included in excess in the battery so that the battery capacity was controlled by the capacity of the negative electrode. Then, the cycle characteristic of the battery was evaluated. The result is shown in FIG. 7.

Example 15

A battery was fabricated in substantially the same manner as in Example 14, except that a carbon electrode prepared in the same manner as in Example 9 and stamped into a size of 15 mm$\Phi$ was used as a negative electrode. Then, the cycle characteristic of the battery was evaluated. The result is shown in FIG. 7.

Example 16

A carbon electrode prepared in the same manner as in Example 2 and cut into a size of 7×4 mm$^2$ was used as a negative electrode. The thickness of the negative electrode was 350 $\mu$m, and the active-substance density of the electrode was 1.02 g/cm$^3$.

For preparation of a positive electrode active material, lithium carbonate, cobalt carbonate and antimony trioxide were weighed such that the ratio of lithium atoms, cobalt atoms and antimony atoms was 1:0.95:0.05. After the weighed compounds were mixed in a mortar, the power mixture was calcinated in the air at 900° C. for 20 hours, and then powdered in a mortar to obtain a powdery positive-electrode active material. The active material thus obtained had a composition formula LiCo$_{0.95}$Sb$_{0.05}$O$_2$. A positive electrode was prepared in the same manner as in Example 14 by using the active material as a positive electrode material.

Figure 8:
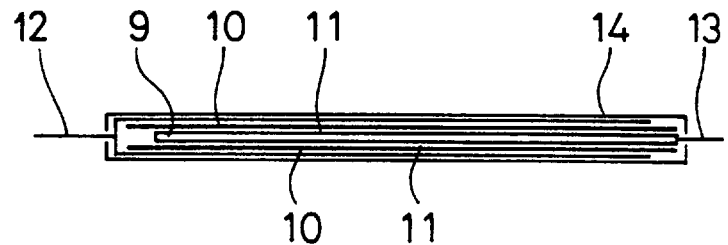
FIG. 8 is a vertical sectional view illustrating a thin secondary battery according to the present invention.

The positive electrode thus prepared was cut into a size of 7×4 mm$^2$ and provided on the opposite sides of the negative electrode with intervention of separators. In turn, the structure thus obtained was packaged with a laminar aluminum film, which was fused for sealing. Thus, a thin battery having a structure as shown in FIG. 8 was fabricated. In FIG. 8, reference numerals 9, 10, 11, 12, 13 and 14 denote the negative electrode, the positive electrode, the separators, a positive electrode current collector, a negative electrode current collector and the laminar pack, respectively. The cycle characteristic of the battery thus fabricated was evaluated. The result is shown in FIG. 7.

Comparative Example 5

A coin-type battery was fabricated in the same manner as in Example 14 by using as a negative electrode a carbon electrode prepared in the same manner as in Comparative Example 1 and stamped into a size of 15 mm$\Phi$. The cycle characteristic of the battery thus fabricated was evaluated. The result is shown in FIG. 7.

Comparative Example 6

A coin-type battery was fabricated in the same manner as in Example 14 by using as a negative electrode a carbon electrode prepared in the same manner as in Comparative Example 2 and stamped into a size of 15 mm$\Phi$. The cycle characteristic of the battery thus fabricated was evaluated. The result is shown in FIG. 7.

Example 17

Figure 9:
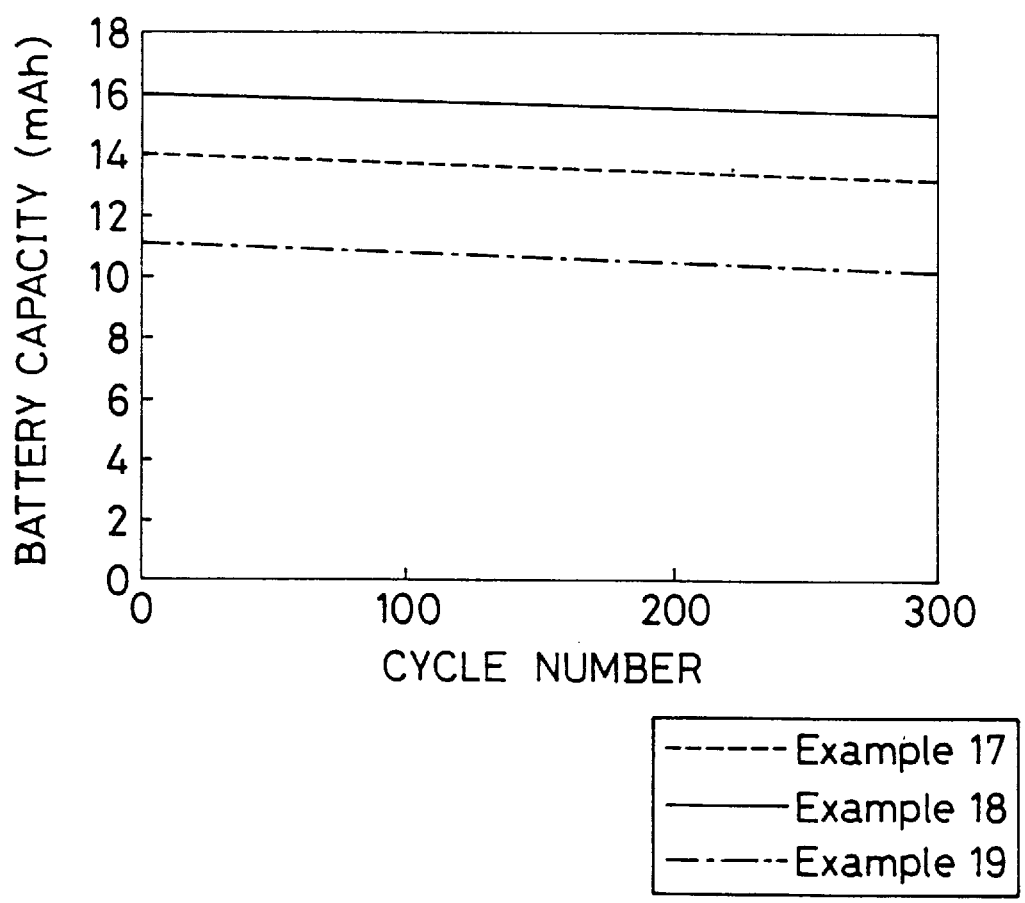
FIG. 9 is a graphical representation illustrating cycle characteristics of batteries of Examples 17 and 18.

A coin-type battery was fabricated in substantially the same manner as in Example 14, except that the carbon electrode prepared in Example 10 was used as a negative electrode. The cycle characteristic of the battery thus fabricated was evaluated. The result is shown in FIG. 9.

Example 18

A coin-type battery was fabricated in substantially the same manner as in Example 14, except that the carbon electrode prepared in Example 13 was used as a negative electrode. The cycle characteristic of the battery thus fabricated was evaluated. The result is shown in FIG. 9.

Example 19

A coin-type battery was fabricated in substantially the same manner as in Example 14, except that the carbon electrode prepared in Example 1 was used as a negative electrode. The cycle characteristic of the battery thus fabricated was evaluated. The result is shown in FIG. 9.

As can be seen from FIG. 9, the secondary battery of Example 17 using a carbon electrode of three-dimensional structure had an improved cycle characteristic in comparison with the battery of Example 19. The secondary battery of Example 18 had a further improved cycle characteristic, which battery employed the carbon electrode prepared by filling and compacting the graphite particles in the metal collector of three-dimensional structure, then impregnating the carbon material into the metal collector and sintering the graphite particles and the carbon material in the metal collector.

When the carbon electrode of the present invention is used for a nonaqueous secondary battery, side reactions such as the decomposition of an ion conductor can be suppressed and the initial charge-discharge efficiency of the battery can be improved. Since the carbon electrode includes graphite particles and a carbon material serving as an active substance which have been sintered together on a metal collector or in the presence of the metal collector, a secondary battery using the carbon electrode has a high energy density and an improved cycle characteristic. This is because the aforesaid side reactions are suppressed and the surface of the carbon electrode is covered with the carbon material having a low crystallinity thereby permitting lithium intercalation and deintercalation to readily occur. Further, the carbon material having a low crystallinity alleviates the expansion and contraction of the graphite particles which may occur in association with the intercalation and deintercalation of lithium and, therefore, imparts a mechanical strength to the carbon electrode. Since the carbon electrode includes no binder, the carbon electrode can be dried at a temperature in a wider range. Therefore, the time required for drying the carbon electrode can be shortened by employing a higher temperature for the drying.

A carbon electrode having a higher capacity can be obtained by using graphite particles having such characteristics that the mean interfacial spacing $d_{002}$ between (002) planes is 0.335 nm to 0.340 nm, the crystallite size Lc in the (002) plane direction is not less than 10 nm, and the crystallite size La in the (110) plane direction is not less than 10 nm.

Since the metal collector serving to catalyze carbon graphitization is formed of iron, nickel or cobalt or an alloy including at least one of these metals, the heat treatment can be carried out at a relatively low temperature. Therefore, the metal collector of the carbon electrode is not adversely influenced by the heat treatment.

Since the metal collector serving to catalyze carbon graphitization has a three-dimensional structure, the formation of carbides during the heat treatment can be suppressed, and the cost of the carbon electrode can be reduced. Further, the active material density of the carbon electrode can be increased and the active material can be firmly bound to the carbon electrode. Therefore, the cycle characteristic of the carbon electrode can be improved.

Moreover, the three-dimensional structure has a porosity of 60% to 95% and/or is formed of a matrix of a metal filament having a diameter of 20 $\mu$m to 200 $\mu$m. Therefore, the carbon electrode has a sufficient strength and exhibits an excellent current collecting effect, and the active material density in the carbon electrode can be increased.

The nonaqueous secondary battery of the present invention includes at least a negative electrode, a positive electrode and an ion conductor, wherein the negative electrode is comprised of the aforesaid carbon electrode. Therefore, the nonaqueous secondary battery has a high energy density and is excellent in the cycle characteristic and safety.

In accordance with the present invention, the carbon electrode for a nonaqueous secondary battery is prepared by either of the following two processes.

One process includes the steps of: mixing graphite particles and a precursor of a carbon material; applying a mixture of the graphite particles and the precursor on a metal collector serving to catalyze carbon graphitization; and calcinating the metal collector to sinter the graphite particles and the carbon material on the metal collector or in the presence of the metal collector.

The other process includes the steps of: filling graphite particles in a metal collector of three-dimensional structure serving to catalyze carbon graphitization; compacting the graphite particles in the metal collector to allow the graphite particles to be retained in the metal collector; impregnating a precursor of a carbon material into the metal collector; and calcinating the metal collector to sinter the graphite particles and the carbon material in the presence of the metal collector.

Therefore, the carbon graphitization can be achieved simply by heat-treating the carbon precursor in the inert atmosphere. Since the metal collector serves to catalyze the carbon graphitization, the heat treatment can be performed at a relatively low temperature, and the resultant metal collector containing the graphite particles and the carbon material can be used as a carbon electrode without the need for an additional process step. Hence, the preparation process for the carbon electrode can be simplified and the preparation cost can be reduced.

According to the latter preparation process, the density of the active material contained in the carbon electrode can be increased, so that the carbon electrode has an increased capacity density. Further, carbon electrodes having a uniform quality can be manufactured, so that the variation in the characteristics among the carbon electrodes can be minimized. Thus, the reliability of a secondary battery employing the carbon electrode can be improved.

What is claimed is:

1. A process for preparing a carbon negative electrode for a nonaqueous secondary battery, comprising the steps of:

applying to a metal collector graphite particles and a precursor of carbon material;

allowing the metal collector to catalyze graphitization of the carbon material; and calcinating the metal collector to form the carbon negative electrode.

2. A process as set forth in claim 1, wherein the graphite particles and the precursor of carbon material are applied by mixing the graphite particles and the precursor and applying the resultant mixture on the metal collector.

3. A process as set forth in claim 1, wherein the graphite particles and the precursor of carbon material are applied by filling graphite particles into the metal collector having a three-dimensional structure; compacting the particles into the structure of the metal collector, and impregnating the precursor into the structure of the metal collector.

4. A process as set forth in claim 1, wherein the precursor is obtained by carbonizing tar or pitch.

5. A process as set forth in claim 1, wherein the precursor is obtained by melting a polymeric material or dissolving a polymeric material in a solvent.

6. A process as set forth in claim 1, wherein the metal collector is formed of a metal selected from the group consisting of iron, nickel, cobalt and an alloy including at least one of iron, nickel and cobalt.

7. A process as set forth in claim 1, wherein the graphite particles have such characteristics that the mean interfacial spacing ($d_{002}$) between (002) planes is 0.335 nm to 0.340 nm, the crystallite size (Lc) in a (002) plane direction is not less than 10 nm and the crystallite size (La) in a (110) plane direction is not less than 10 nm, which are determined by an X-ray wide-angle diffraction analysis.

* * * * *